(12) United States Patent
Mitchell et al.

(10) Patent No.: US 7,122,236 B2
(45) Date of Patent: Oct. 17, 2006

(54) CLOTHES SECURING SYSTEM

(75) Inventors: Amanda B. Mitchell, 1803 Landrake Rd., Towson, MD (US) 21204; James F. Zalenski, Oakton, VA (US)

(73) Assignee: Amanda B. Mitchell, Towson, MD (US)

( * ) Notice: Subject to any disclaimer, the term of this patent is extended or adjusted under 35 U.S.C. 154(b) by 50 days.

(21) Appl. No.: 10/658,737

(22) Filed: Sep. 9, 2003

(65) Prior Publication Data
US 2004/0109988 A1 Jun. 10, 2004

Related U.S. Application Data

(60) Provisional application No. 60/409,056, filed on Sep. 9, 2002.

(51) Int. Cl.
| | |
|---|---|
| B32B 9/00 | (2006.01) |
| B32B 33/00 | (2006.01) |
| A41C 1/06 | (2006.01) |
| A41C 3/00 | (2006.01) |
| A41D 27/26 | (2006.01) |

(52) U.S. Cl. ............... 428/40.1; 428/195.1; 2/459; 2/460; 2/461; 450/7; 450/14; 450/30; 450/81; 450/86

(58) Field of Classification Search ............ 428/40.1, 428/42.3, 42.2, 195.1; 2/459–464; 450/7, 450/14, 30, 81, 86
See application file for complete search history.

(56) References Cited

U.S. PATENT DOCUMENTS

| | | | | |
|---|---|---|---|---|
| 2,719,303 | A | * | 10/1955 | Lodenius .................. 2/105 |
| 3,947,896 | A | * | 4/1976 | Taylor ..................... 2/217 |
| 4,616,644 | A | * | 10/1986 | Saferstein et al. ............ 602/48 |
| 5,308,278 | A | * | 5/1994 | Huang ..................... 450/86 |
| 5,354,261 | A | * | 10/1994 | Clark et al. ................. 602/58 |
| 5,539,931 | A | * | 7/1996 | Fizer et al. ................. 2/268 |
| 5,803,792 | A | * | 9/1998 | Roush et al. ................. 450/86 |
| 5,913,413 | A | * | 6/1999 | Huyck ..................... 2/459 |
| 5,914,166 | A |   | 6/1999 | Le ........................ 428/40.1 |
| 5,939,339 | A | * | 8/1999 | Delmore et al. ............. 442/149 |
| 6,146,239 | A | * | 11/2000 | Magliocchetti .............. 450/1 |

OTHER PUBLICATIONS

Braza Strap e-e-z, 1994 Brazabra Corp.

* cited by examiner

*Primary Examiner*—Harold Pyon
*Assistant Examiner*—Patricia L Nordmeyer
(74) *Attorney, Agent, or Firm*—Ryan Kromholz & Manion, S.C.

(57) ABSTRACT

A fabric securing system having a strip of flexible material for securing two pieces of fabric or clothing is disclosed. The system has at least a portion of one of its sides containing an adhesive material. Both sides of the system may contain an adhesive portion.

13 Claims, 5 Drawing Sheets

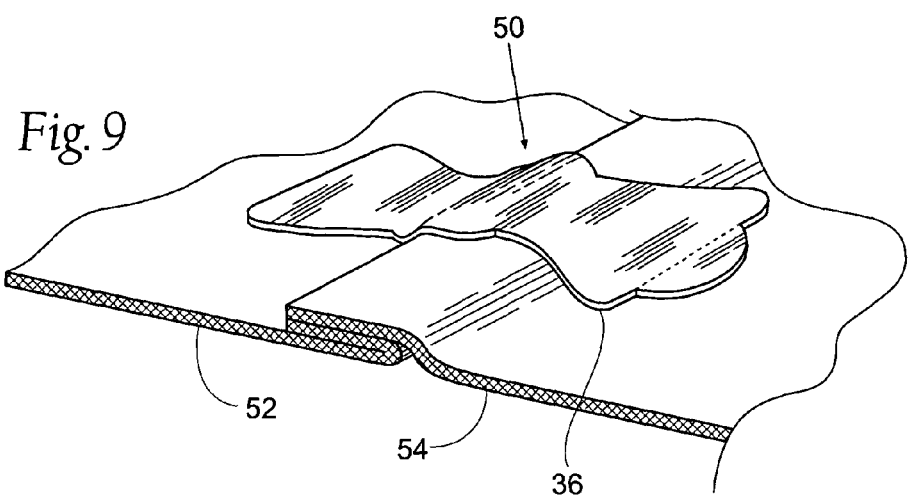
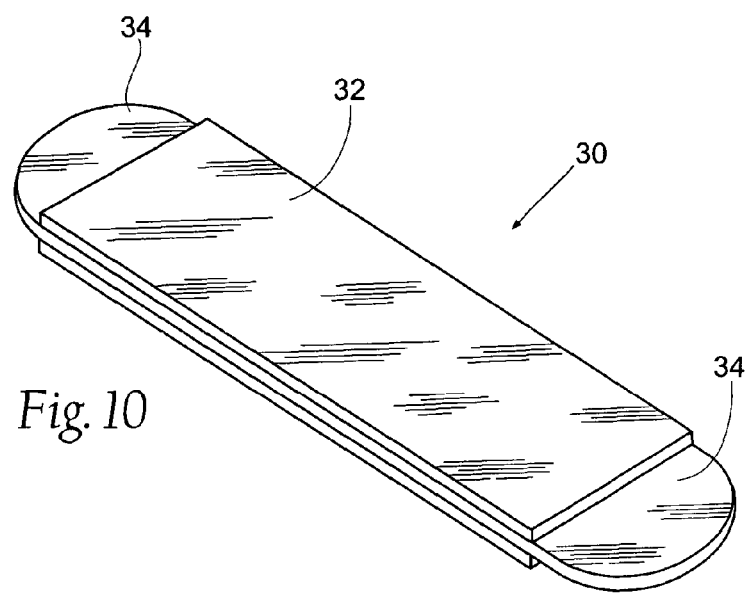
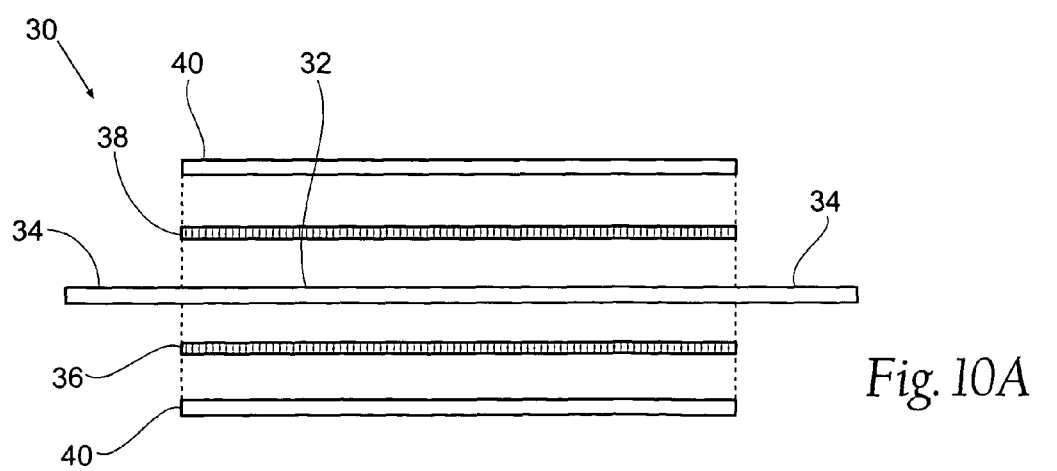

CLOTHES SECURING SYSTEM

RELATED APPLICATION

This application claims the benefit of U.S. provisional application Serial No. 60/409,056 filed 9 Sep. 2002.

BACKGROUND OF THE INVENTION

Neatly kept clothing is a cornerstone of fashion. Even when a person is dressed fashionably, a visible bra strap, visible undergarment, or an untucked shirt may be unsightly, which may interfere with a person's appearance and also may frustrate that person. Consequently, there is a need for device to hold clothing in place.

Previous designs have addressed this problem. For instance, U.S. Pat. No. 5,914,166 issued to Le discusses an adhesive strip that may hold a bra strap in place within a shirt. However, the device is difficult for aligninment on the bra strap, especially if a user has a sore neck or has difficulty turning her head. Likewise, the adhesive material may easily contact the skin if not properly aligned, which may be uncomfortable or irritating to the wearer. Other similar strips have been contemplated to hold bra straps in place, but have not efficiently contemplated adjustability needs of a person. Thus an efficient, non-permanent system is needed to comfortably and easily hold clothing in place.

SUMMARY OF THE INVENTION

The invention relates to a cost-effective, non-permanent system and method for securing one piece of fabric to a second piece of fabric in a useful, cost-effective manner. The invention comprises a strip of flexible material with a side having at least a portion covered by adhesive material and a portion that is non-adhesive. Such an arrangement allows the two pieces of fabric to be secured to each other while not necessarily adhering the two pieces of fabric to one another. The system is especially convenient for positioning a bra strap underneath a shirt or other piece of clothing. The secured bra strap is hidden from sight and is also prevented from sliding down the wearer's shoulder. However, the system allows for the bra strap to slide in relation to the shirt in a channel formed by the securing system and the shirt.

Additionally, a tabular area may be integrally formed with the strip of flexible material. The tabular area is non-adhesive and will assist the user in positioning and removing the strip of material.

The invention may be used for such situations as securing a bra strap to a shirt, securing a shirt within a pair of pants, or secure two pieces of cloth that need to be sewed together. The use of the tab allows for a design wherein both sides of the strip of material are adhesive.

The present invention provides a comfortable, easy to apply securing system. For instance, if a person has trouble turning her neck when applying the system, application is still possible without visually noting the placement of the system. Prior art needs visual confirmation that an adhesive material is aligned precisely on both the outer garment and the undergarment. However, the present invention does not adhere the bra or other undergarment directly to a shirt, but rather cradles or channels the bra within the securing system and the shirt. Thus, the system allows for more tolerance when positioning the system and also prevents the adhesive material from contacting the user's shoulder unnecessarily.

BRIEF DESCRIPTION OF THE DRAWINGS

FIG. 9 shows a perspective view of the embodiment of FIG. 8 securing together two pieces of cloth.

FIG. 10 shows a perspective view of an alternative embodiment of the present invention.

FIG. 10A shows an exploded side view of the embodiment shown in FIG. 10.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
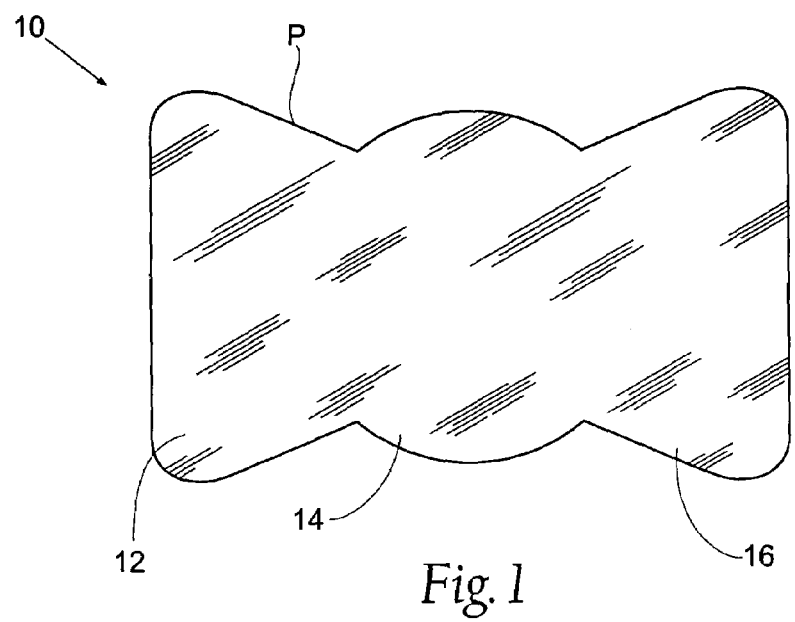
FIG. 1 is top view of a first embodiment of the present invention.

Referring to FIG. 1, a fabric securing system 10 having a predetermined perimeter P is shown. The system consists of a first section 12, a second section 14, and a third section 16. The second section 14 is integrally formed between the first section 12 and the third section 16. The perimeter P of the system 10 is shown as having a bowtie shape, with the first section 12 and the third section 16 tapering outwardly from the second section 14. However, as will become further evident, the perimeter P may be of any configuration or shape. Further, the fact that this embodiment is shown with integral sections does not exclude alternative embodiments wherein the sections are either coupled or connected.

Figure 2:
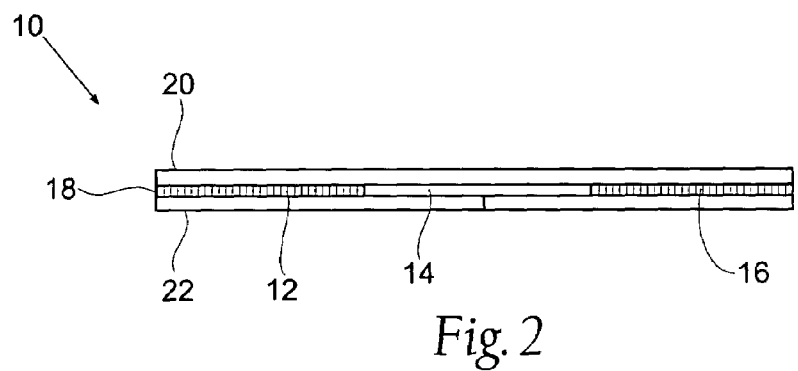
FIG. 2 is an enlarged side view of the embodiment shown in FIG. 1.

The system 10 of FIG. 1 is shown from an enlarged side view in FIG. 2. A first side 18 is comprised of the first section 12, the second section 14, and the third section 16. The first section 12 and the third section 16 comprise an adhesive material. The second section 14 is non-adhesive and may consist of a pad or a cushion-type material. Likewise, the second section 14 may simply be an area that is a non-coated section without an adhesive material. As viewed in FIG. 2, a second side 20 is shown above the first side 18. The second side 20 is non-adhesive, which allows for the system 20 to be place on a person's skin without adhering to the skin. Below the first side 18 lies a removable backing 22. While not necessary for the present invention, the removable backing 22 allows the system 10 to retain its adhesive properties until the system 10 is applied to fabric.

Figure 2A:
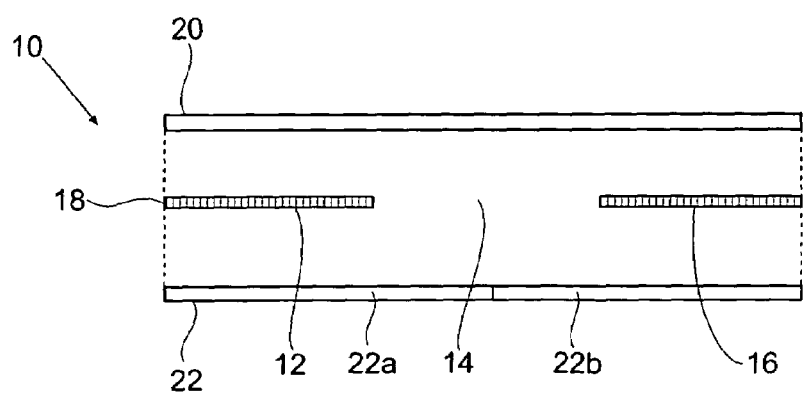
FIG. 2A is an exploded view shown in FIG. 2.

FIG. 2A shows an exploded side view of the embodiment in FIG. 2. The first side 18 can be clearly seen as comprising the first section 12, the second section 14, and the third section 16. Because the second section 14 does not include any adhesive material, a non-coated, or a void area, represents the second section 14. The removable backing 22 is shown comprising two sections 22a and 22b which meet near the center of the second section 14. Because the second section 14 is non-adhesive, the removable backing is easily removed from the system 10. However, it should be noted that the system 10 may work also if the backing 22 comprises one section or more than two sections. Furthermore, the backing 22 may be designed so that the sections 22a and 22b cover only adhesive sections 12 and 16, and the backing 22 does not cover the non-adhesive section 14.

Figure 3:
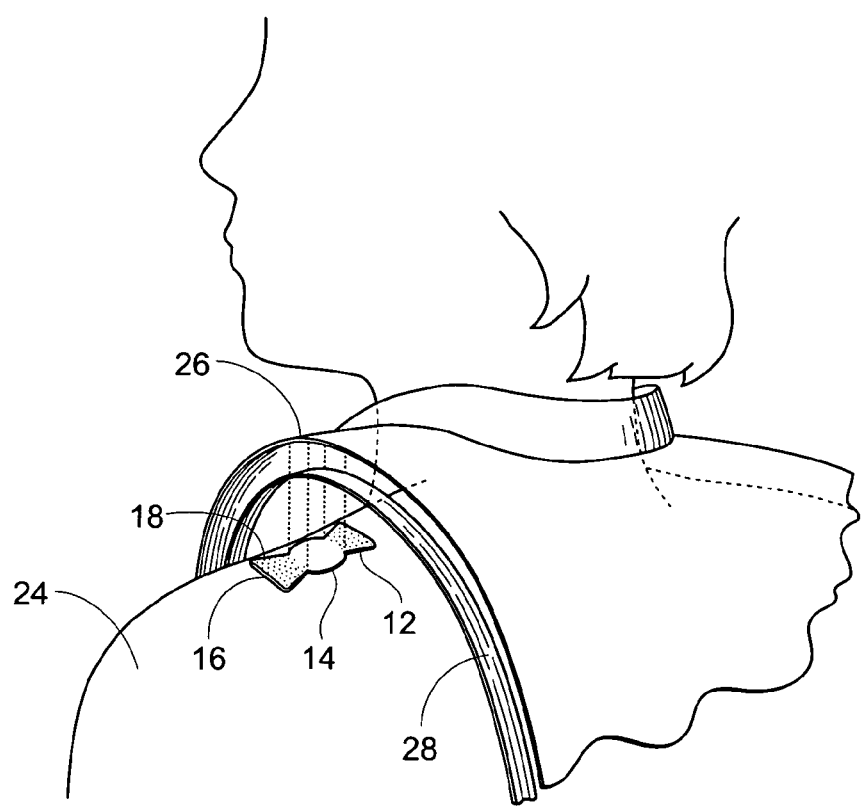
FIG. 3 is a sectional perspective view of the invention as used on a shirt and a bra.

FIG. 3 shows one possibility of the system 10 being applied to a person's clothing. The system 10 is placed on top of a shoulder 24 with the adhesive side 18 facing away from the shoulder 24. The removable backing 22 should be removed from the system 10. The first section 12 is adhered to a shirt, dress, or other garment 26. Once adhered, a bra strap or other undergarment 28 is aligned with the non-adhesive second section 14 or placed atop the second section 14. The wearer than adheres the third section 16 to the shirt 26, thereby securing the shirt 26 and the bra strap 28 together. A unique feature of the present invention is that the shirt 26 and the bra strap 28 are secured to each other, but not adhered to each other. This allows the shirt 26 and the bra strap 28 to move in a predetermined relationship to one another. The shirt 26 and the second section 14 form a channel that holds the bra strap 28 in place. The channel allows the bra strap 28 to slidingly rest between the shirt 26 and the system 10. The channel, though preferred to be non-adhesive, may be designed with some adhesive qualities, if desired.

Thus, the bra strap 26 is hidden from view without unnecessarily constricting the wearer's movements. The device is also non-permanent and offers an ease of use, flexibility, and disposability not provided by a permanent sewn in cloth lingerie strap.

Figure 4:
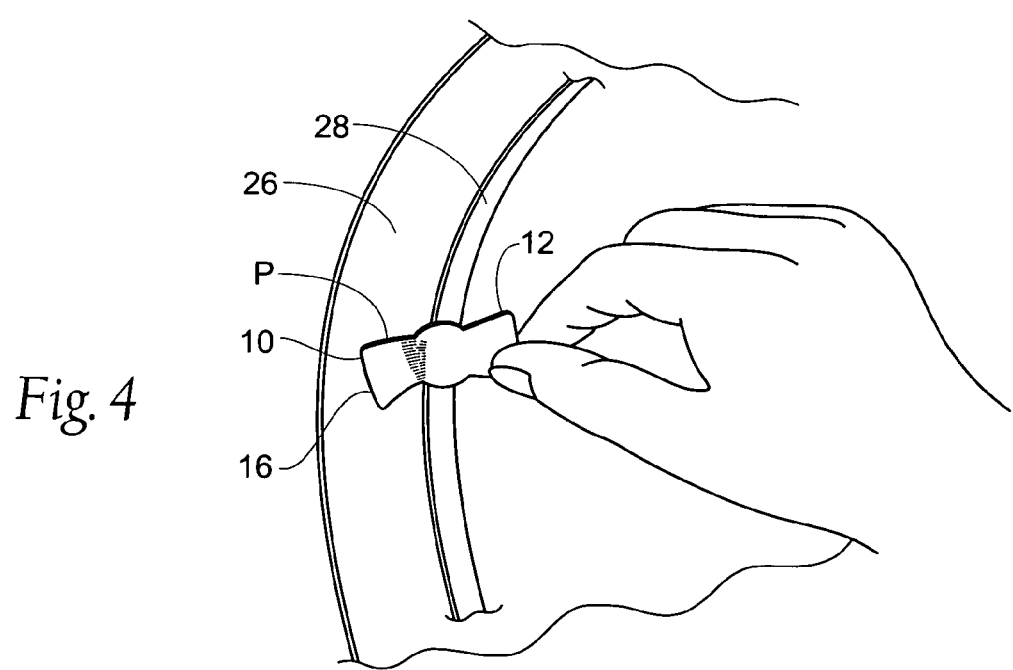
FIG. 4 shows a sectional view of a person adjusting the present invention.

As shown in FIG. 4, the system 10 may be adjusted once applied. The system 10 is pulled away from the shirt 26 at either the first section 12 or the third section 16. The user can readjust the bra strap 26 relative to the shirt 28 and the system 10 as needed, quickly and efficiently. Depending on the strength of the adhesive, the system 10 may be readjusted a varying number of times. The user then readheres the section 12 or 16 that was removed. If necessary, the entire system 10 may be removed from the shirt 26 and readjusted. To make adjustment effective for a variety of clothing options, the perimeter P may be of any configuration. For instance, if the shirt 26 had narrower shoulder areas, such as on a tank top, the first section 12 and the third section 16 may be designed as relatively narrower sections.

Figure 5:
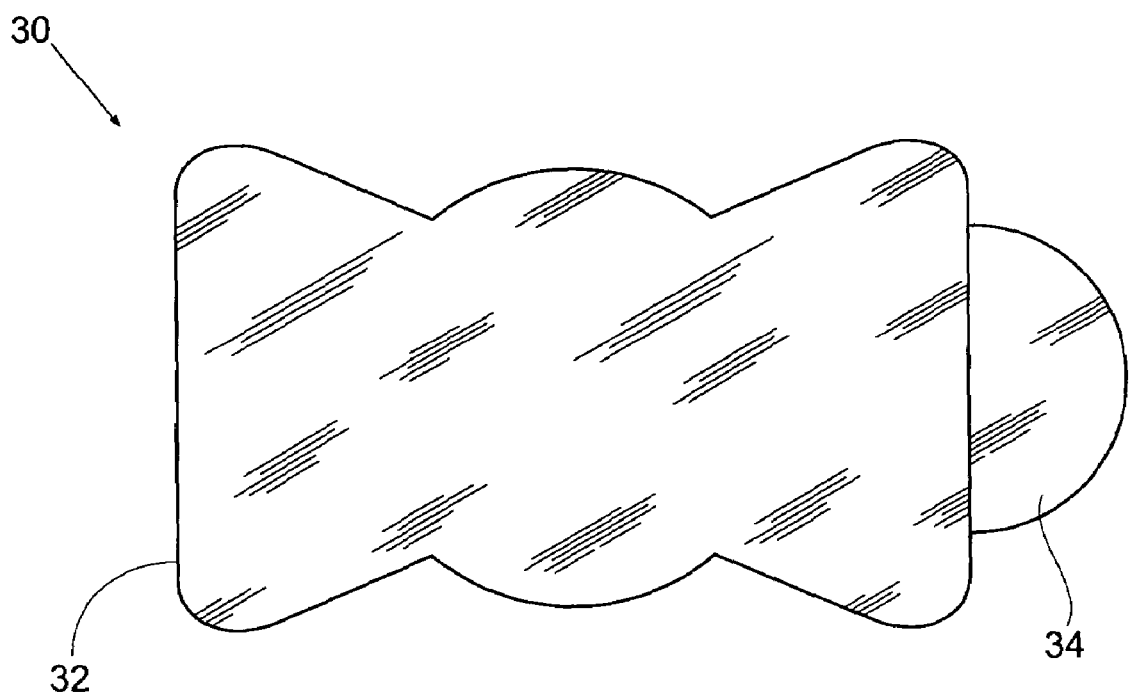
FIG. 5 is a top view of a second embodiment of the present invention.

FIG. 5 shows a second embodiment of the present invention. A fabric securing system 10 is shown in FIG. 1. The second embodiment 30 is generally comprised of a strip of flexible material 32 with a tabular area 34. The tabular area or tab 34 is integrally formed with the strip of flexible material 32, and may be formed as an extension of the strip of flexible material 32, or the tab 34 may be a separate piece of material connected to the strip of flexible material 32. Likewise, the tab 34 is shown located along an exterior edge of the strip of material 32. However, the tab 34 may be connected anywhere to the strip of material 32 and still allow the user to adjust the second embodiment 30 when applied to fabric or a person's clothing.

Figure 6:
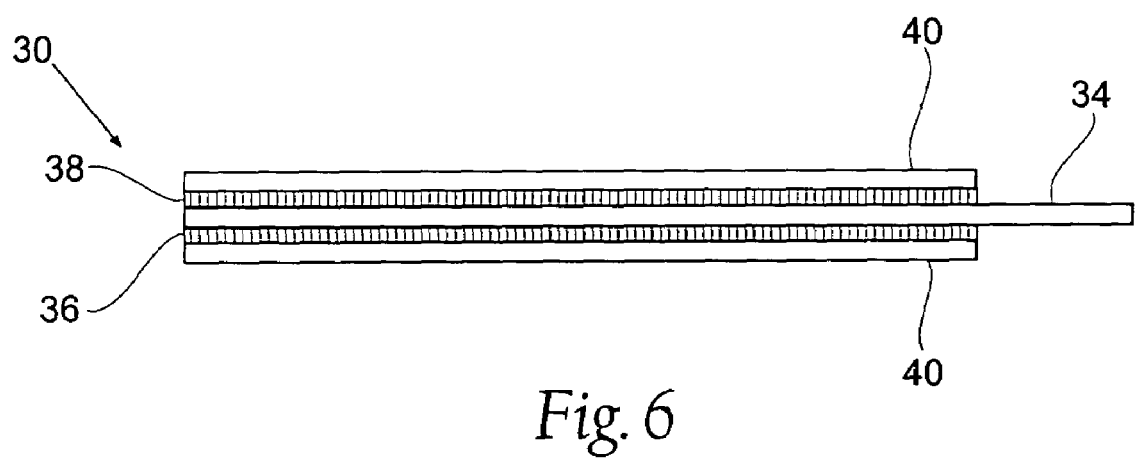
FIG. 6 is an enlarged side view of the embodiment shown in FIG. 5.

FIG. 6 is an enlarged side view of the second embodiment 30 shown in FIG. 5. The strip of material 32 has a first side 36 and a second side 38. Both the first side 36 and the second side 38 contain at least a portion that is covered with an adhesive material. A pair of removable backings 40 may be used to protect the adhesive sections of 36 and 38 until applied to clothing or fabric. As shown, the tab 34 is an extension of the strip of material 32 and is not covered by an adhesive material. The removable backings 40 are shown as comprising single pieces of material. However, as previously described and shown in FIGS. 2 and 2A, the removable backings may be formed of more than one piece of material.

Figure 7:
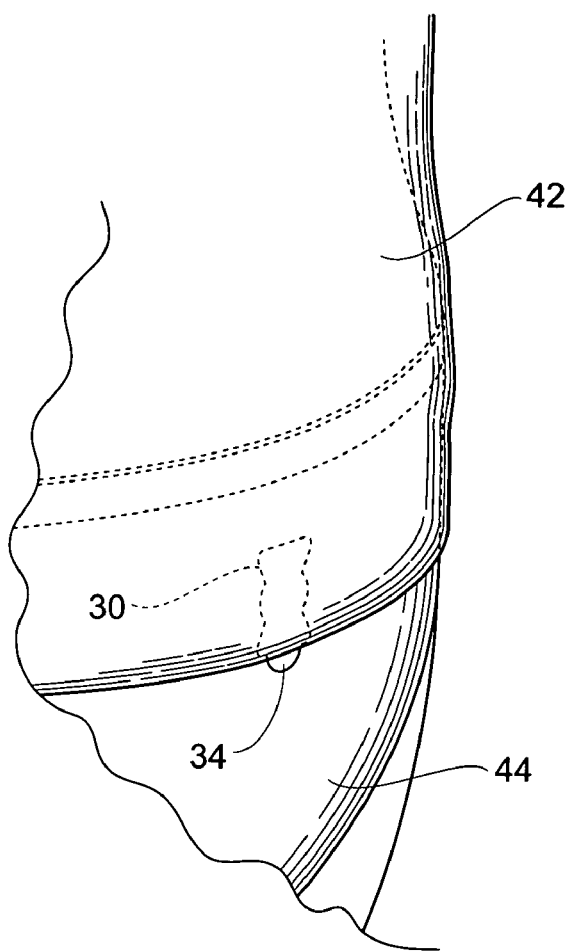
FIG. 7 shows a sectional view of the present invention as used on a shirt and an underwear bottom.

FIG. 7 shows a fragmentary view of the second embodiment 30 (shown in phantom) being applied to two pieces of fabric. A shirt bottom 42 is shown lying over an undergarment 44. Many times it is difficult for a wearer to keep the shirt bottom 42 tucked inside of a pair of pants or skirt (not shown). The present invention allows the wearer to keep the shirt bottom 42 tucked in by adhering the second embodiment 30 to both the shirt bottom 42 and the undergarment. The exposed tab 34 allows the wearer to adjust, reapply, or reposition the system 30 if necessary. For example, if a person was to use a restroom and needed to disengage the fastened clothing, the system 30 may be reapplied after attending to the person's needs. Additionally, as many or as few of the systems 30 may be employed in different positions to ensure that the shirt bottom 32 is neatly tucked away.

Figure 8:
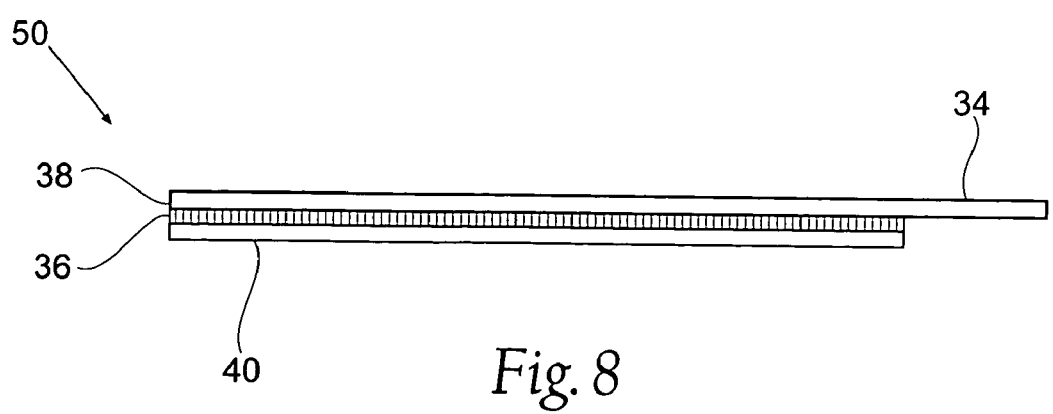
FIG. 8 is an enlarged side view of another embodiment of the present invention.

FIG. 8 shows a side view of another embodiment 50 of the present invention. The embodiment 50 is similar to the embodiment 30 of FIG. 6, except the second side 38 is non-adhesive. The first side 36 still has an adhesive portion, and the tab 34 extends past the adhesive portion. Such an arrangement may be beneficial in situations as shown in FIG. 9. Two pieces of fabric 52 and 54 are placed over one another to hold them together. For instance, if the pieces of fabric 52 and 54 are to be sewed together, the system 50 allows a person to use fewer pins than what would have been previously used, or possibly no pins at all. This provides for a safer sewing environment and also makes it easier to adjust the fabric before sewing begins. Furthermore, this embodiment could potentially be used instead of the embodiment 30 shown in FIG. 7 for adhering the shirt bottom 42 to the undergarment 44, with the adhesive side 36 overlapping both the outside of the shirt bottom 42 and the outside of the undergarment 44.

FIG. 10 shows a different arrangement of the embodiment 30 of the system. A second tab 34 is integrally formed with the strip of flexible material 32. Using the two tabs 34 may make it easier to grab and reposition the system 30 relative to two pieces of fabric. Additionally, the system 30 has a rectangular perimeter as opposed to the previous bowtie shape. As previously noted, the present invention may work with any perimeter arrangement. The embodiment of FIG. 10 is advantageous when used around the abdominal section, where the system 30 would run parallel to a waistline. The two tabs 34 assist the user in easily adjusting the system 30.

The arrangement in FIG. 10 is shown from an exploded side view in FIG. 10A. The first side 36 and the second side 38 both have portions covered with an adhesive material. The removable backing 40 is shown as coinciding with the adhesive portions of the first side 36 and the second side 38. However, the backing 40 may extend past the adhesive portions, if preferred, or divided into separate sections as previously noted.

As suggested by the above examples, the present invention may be utilized in many different situations. The flexibility of the system allows a user to secure and adhere different fabrics and clothes. For, instance, while previous systems may have been designed to adhere a bra strap to a piece of clothing, no non-permanent system attempts to secure the strap in place without adhering the strap to the clothing. This system gives the user much more flexibility compared to a sewn in strap and comfort and ease of use compared to other non-sewn in products.

The system may be designed in any colors or colorless, and any suitable shapes depending on the users tastes or needs. Any suitable adhesive material may be used, provided that the adhesive material will stick to clothing. The adhesive material may be of any degree of adhesion. Preferably, the adhesion is of such a nature that it will be used during a single day or event. This allows sufficient adhesion so that the user may readjust the system, but will allow the systems to be economically manufactured and inexpensive for the user. The systems may be discarded after use.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A fabric securing system, in combination with a first clothing strap and a second piece of fabric, for securing said first clothing strap relative to said second piece of fabric, said fabric securing system comprising:
   a strip of flexible material having a first side, a second side, and a perimeter having a predetermined configuration;
   said first side having at least a portion thereof coated with an adhesive material;
   said second side being devoid of adhesive material; and
   a channel, said channel formed by a first section of said first side of said strip of flexible material adhered to second piece of fabric and a second section of said first side of said strip of flexible material adhered to second piece of fabric, said channel sized to receive the width of said strap, said channel sized to slidingly secure said strap within said channel, wherein said strap is allowed to move in a predetermined relationship to said second piece of fabric.

2. The fabric securing system of claim 1 wherein said first side of said flexible strip of material further comprises:
   said first section;
   said second section;
   a third section;
   said third section integrally formed between said first and second sections;
   said first and second sections forming said portion of adhesive material; and
   said third section and said second piece of fabric forming said channel.

3. The fabric securing system of claim 2 wherein said first and third section of said strip of flexible material being adhesively connected to said second piece of fabric, said first piece of fabric slidingly secured within said channel.

4. The fabric securing system of claim 2 wherein said channel is non-adhesive.

5. The fabric securing system of claim 2 wherein said second section of said flexible strip of material further comprising a pad.

6. The fabric securing system of claim 1 further comprising a removable backing material located on said first side of material.

7. The fabric securing system of claim 2 wherein said second section is a non-coated section.

8. A fabric securing system, in combination with a first clothing strap and a second piece of fabric, for securing said first clothing strap to said second piece of fabric, said fabric securing system comprising:
   a strip of flexible material having a first side and a second side and a perimeter having a perimeter with a predetermined configuration, said first side having at least a portion of adhesive material;
   said second side being devoid of adhesive material;
   a channel, said channel formed by a first portion of said strip of flexible material adhered to second piece of fabric and a second portion of said strip of flexible, adhered to said second piece of fabric, said channel sized to receive the width of said strap, said channel sized to slidingly secure said strap within said channel, wherein said strap is allowed to move in a predetermined relationship to said second piece of fabric; and
   a non-adhesive tabular area integrally formed with said strip of flexible material.

9. The fabric securing system of claim 8 further comprising a removable backing material located on said adhesive first side of material.

10. The fabric securing system of claim 8 further comprising a second non-adhesive tab connected to said strip of flexible material.

11. The fabric securing system of claim 8 wherein said second piece of fabric is a shirt.

12. The fabric securing system of claim 8 wherein said second side of said strip of flexible material has at least a portion of adhesive material.

13. A disposable fabric securing system, in combination with a first clothing strap and a second piece of clothing, for releasably securing said clothing strap relative to a second piece of clothing, said fabric securing system comprising:
   a strip of flexible material having a first side, a second side, and a perimeter having a predetermined configuration;
   said first side further comprising an adhesive material, said adhesive material having of sufficient adhesion to releasably secure said clothing strap to said second piece of clothing:
   said second side being devoid of adhesive materials; and
   a channel, said channel formed by a first portion of said strip of flexible material adhered to second piece of fabric and a second portion of said strip of flexible adhered to said second piece of fabric, said first clothing strap being secured within said channel, said channel sized to allow said first clothing strap to freely slide within said channel, when said fabric securing system is secured to said second piece of clothing.

* * * * *

UNITED STATES PATENT AND TRADEMARK OFFICE
CERTIFICATE OF CORRECTION

| | |
|---|---|
| PATENT NO. | : 7,122,236 B2 |
| APPLICATION NO. | : 10/658737 |
| DATED | : October 17, 2006 |
| INVENTOR(S) | : Amanda B. Mitchell and James F. Zalenski |

It is certified that error appears in the above-identified patent and that said Letters Patent is hereby corrected as shown below:

Column 6, line 20, after "flexible" insert -- material --

Signed and Sealed this

Twentieth Day of February, 2007

JON W. DUDAS
*Director of the United States Patent and Trademark Office*